United States Patent [19]

Knappertz

[11] Patent Number: 4,553,882
[45] Date of Patent: Nov. 19, 1985

[54] METHOD AND APPARATUS FOR PNEUMATICALLY CONVEYING FIBER MATERIAL

[75] Inventor: Walter P. Knappertz, Mönchen-Gladbach, Fed. Rep. of Germany

[73] Assignee: Trützschler GmbH & Co. KG, Mönchen-Gladbach, Fed. Rep. of Germany

[21] Appl. No.: 539,064

[22] Filed: Oct. 4, 1983

[30] Foreign Application Priority Data

Oct. 28, 1982 [DE] Fed. Rep. of Germany ....... 3239897

[51] Int. Cl.$^4$ ............................................. B65G 53/56
[52] U.S. Cl. .................................................. 406/181
[58] Field of Search ............. 406/181, 84; 137/561 A, 137/561 R

[56] References Cited

U.S. PATENT DOCUMENTS 3,387,895 6/1968 Hochmuth et al. ................. 406/181

FOREIGN PATENT DOCUMENTS 131633 8/1982 Japan ................................... 406/181

Primary Examiner—Jeffrey V. Nase
Assistant Examiner—Mary Beth O. Jones
Attorney, Agent, or Firm—Spencer & Frank

[57] ABSTRACT

An apparatus for pneumatically conveying fiber-like material includes a main duct and at least two branch ducts communicating with the main duct in a branching zone. The material is entrained by a gas stream from the main duct into the branch ducts. The apparatus further has an arrangement for generating a countercurrent; an arrangement for introducing the countercurrent into the branching zone; and an arrangement for directing the countercurrent into the main duct parallel to the longitudinal axis of the main duct.

3 Claims, 5 Drawing Figures

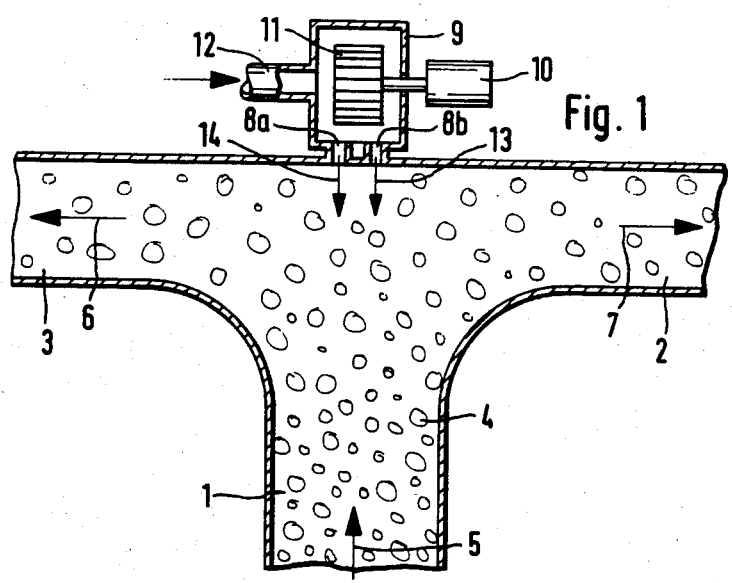
Fig. 1
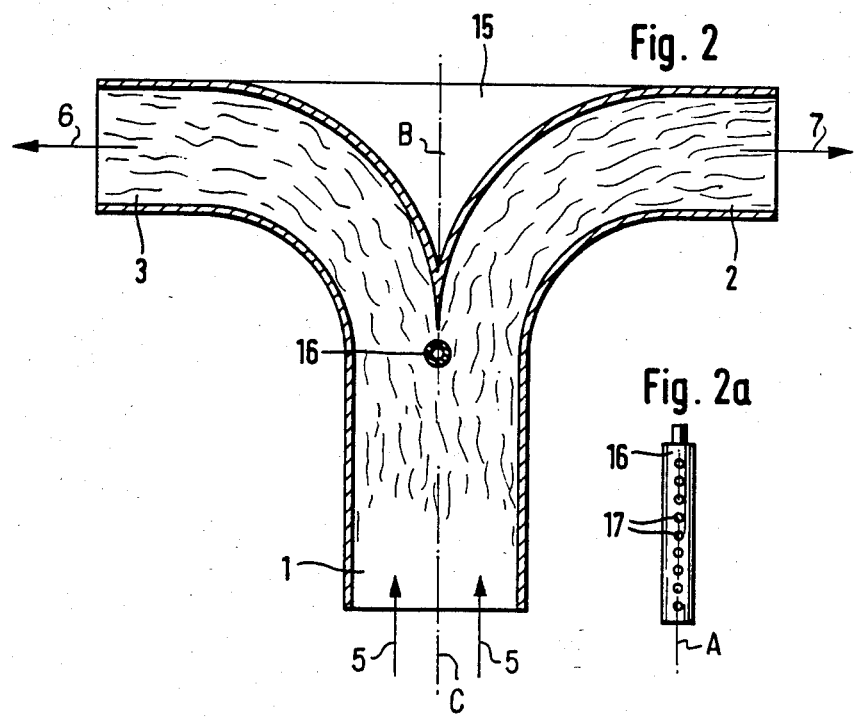
Fig. 2
Fig. 2a

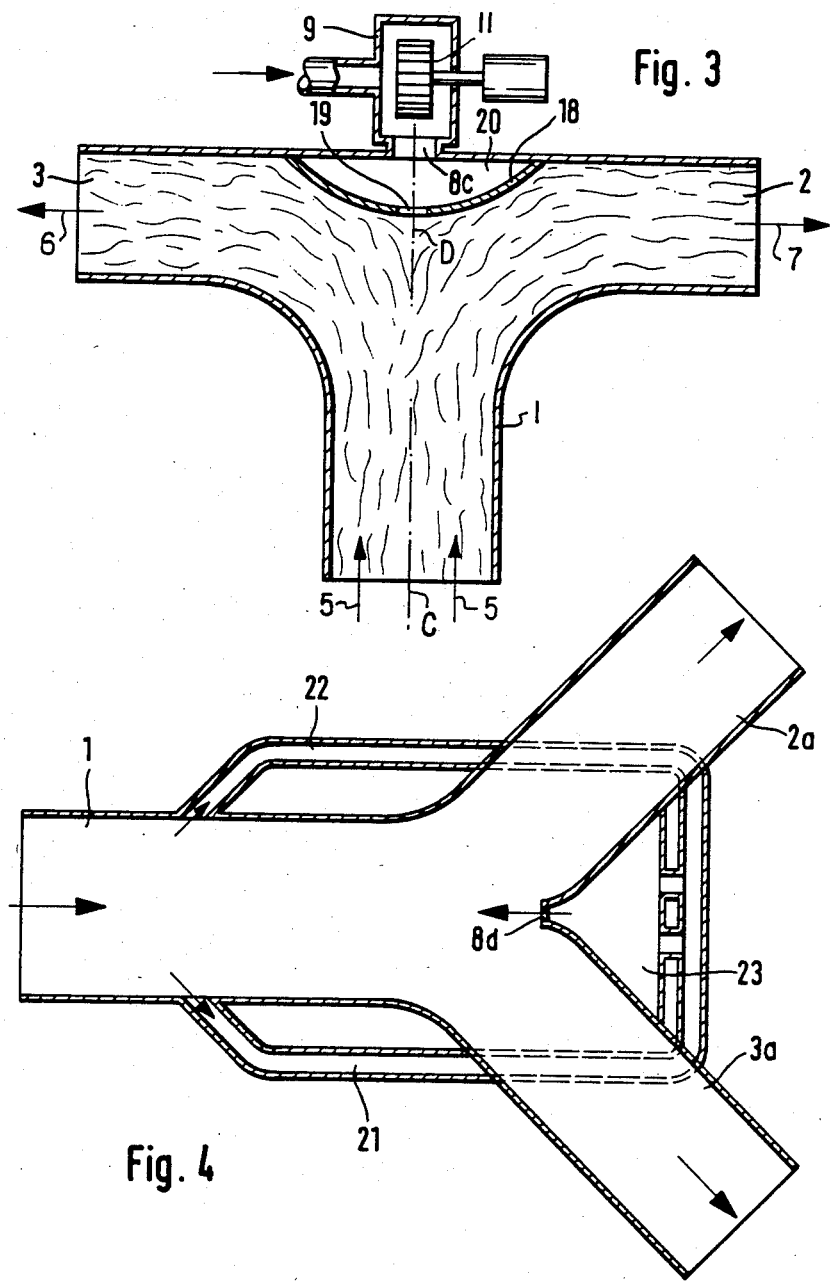

METHOD AND APPARATUS FOR PNEUMATICALLY CONVEYING FIBER MATERIAL

BACKGROUND OF THE INVENTION

This invention relates to a method and an apparatus for conveying fiber-like material, particularly textile fiber tufts, entrained by an air stream from a main duct into at least two branch ducts. Such a pneumatic conveyance of fiber material is conventional in plants which prepare fiber material for processing in spinning mills.

In pneumatic tuft conveying systems the fiber tufts are, by means of a conveying medium such as an air stream, driven through a duct system and admitted to one or more machines which are connected to the common duct system and which may be, for example, openers, cleaners or conveyors or may be carding machines equipped with feed chutes.

It has been found that the degree of the moisture content of fiber tufts or that of the pneumatic system affects not only the charging of the machines such as the charging of feed chutes of carding machines, but also affects the conveyance of the fiber tufts in the ducts. The fiber tufts conveyed in the duct do not behave uniformly. It is a frequent occurrence that, for example, at locations of branch-offs (hereafter "branching zones"), bends or other walls of the conveying ducts, fiber tuft accumulations occur which obstruct the ducts, so that not only the conveyance in the duct is hindered, but also a uniform supply or further processing of the tufts by the successive machine or the charging, for example, of a feed chute of a carding machine are adversely affected. In particular, the risks are high that a uniform deposition of fiber material in the feed chutes of cards is adversely affected as early as the fiber tuft delivery involved with an earlier opening or cleaning process which thus has, during further processing, negative influence on maintaining the number value of a sliver or yarn made of the fiber material.

The occurrence of undesired fiber agglomerations, particularly of chemical fibers in pneumatic tuft delivering systems is most frequently caused by the generation of electrostatic charges. Such charges may be generated by friction resulting from a turbulence in the conveying air stream, by friction between the fiber tufts and the air stream as the processing machine receives the fiber tufts from the delivery system or because of friction between the fiber tufts themselves. Since the fiber tufts move freely in the conveying air stream, the electrostatic charge is not removed and thus remains preserved until the fiber tufts contact an appropriate material which conducts electrostatic charges. In particular, agglomerations of fiber tufts have been observed in relatively dry transport air. Even an excessively high moisture content of the transporting air or the fiber material itself leads to an agglomeration of the fiber tufts which causes not only malfunctions in the pneumatic delivery system but also adversely affects the quality of the product made of the fiber. Since brightening agents applied to the fibers are frequently highly hydroscopic, an adherence of the fiber tufts to one another and to the walls of the ducts because of excessive air humidity is very likely, leading rapidly to malfunctions in the pneumatic air delivery system.

In case of a T-branch, for example, where a main duct is divided into two branch ducts, at the location on the duct walls on which the fiber tufts entrained by the air stream impinge, undesired fiber tuft accumulations occur and thus, fiber material builds up in substantial clumps at those locations. The intermittent release of such clumps causes the fiber tuft material to be admitted in an irregular flow into the one or the other branch conduit and obstructs the conduit. Such occurrences cause significant operational disturbances.

SUMMARY OF THE INVENTION

It is an object of the invention to provide an improved method and apparatus of the above-outlined type which prevents fiber accumulations in a simple manner and thus effectively avoids the danger of malfunctions discussed earlier.

This object and others to become apparent as the specification progresses, are accomplished by the invention, according to which, briefly stated, in a zone where a main duct branches off into branch ducts, an air stream is directed into the main duct, against the air flow conveying the fiber tufts.

The air stream which is directed against the fiber tufts arriving from the main duct prevents the formation of adhering fiber accumulations at the duct surfaces which face the main duct in the branching zones. By virtue of the arrangement according to the invention, the fiber tufts generally do not even reach the stream splitter wedge or wall surfaces perpendicular to the length of the main duct. Such components frequently have residues of brightening agents for chemical fibers; such agents often have side effects. If the fiber tufts nevertheless contact such wall surfaces, they are lifted off by the countercurrent generated according to the invention. The countercurrent can direct the coherent tuft bunches into a branch duct without dividing the same. Or, the incoming tuft stream may be divided by the countercurrent and the partial conveying streams are deflected into the branch ducts.

BRIEF DESCRIPTION OF THE DRAWING

FIG. 1 is a schematic sectional top plan view of a preferred embodiment of the invention.

FIG. 2 is a schematic sectional top plan view of another preferred embodiment of the invention.

FIG. 2a is a front elevational view of a component of the embodiment illustrated in FIG. 2.

FIG. 3 is a schematic top plan view of still another preferred embodiment of the invention.

FIG. 4 is a schematic top plan view of a further preferred embodiment of the invention.

DESCRIPTION OF THE PREFERRED EMBODIMENTS

Turning to FIG. 1, there is shown a typical T-shaped fiber distributor which is a permanent component in a pneumatic fiber conveying duct system. The T-distributor comprises a main duct 1 which forms the stem of the "T" and which branches off into ducts 2 and 3 together forming the head of the "T". The fiber-like material such as fiber tufts 4 and the fiber tuft conveying medium proceed in the main duct 1 in the direction of the arrow 5 and branch off in the direction of the arrows 6 and 7 in the branch ducts 3 and 2, respectively. The walls of the ducts 1, 2 and 3 are designed based on known principles of pneumatic conveyance.

The wall of the branch ducts 2 and 3 facing the main duct 1 is provided with openings 8a and 8b which communicate with a closed housing 9 accommodating a blower 11 driven by a motor 10. The housing 9 is provided with an ambient air intake opening 12. During operation, the blower 11 generates an air stream (countercurrent) which passes through openings 8a and 8b and is, as indicated by arrows 13 and 14, oriented against the direction of the inflowing fiber tufts 4. The countercurrent is sufficiently strong to prevent the fiber tufts from reaching the oppositely-lying wall of the ducts 2 and 3 or, should fiber tufts reach the wall, they are lifted off by the countercurrent. The fiber tufts 4 are thereafter admitted into the ducts 2 and 3.

Turning now to FIG. 2, on the inner wall of the branch conduits 2 and 3 within the T-distributor there is arranged a stream dividing element 15 which is wedge-shaped component and which deflects the conveying stream arriving in the main duct 1 into the branch ducts 2 and 3. Upstream of the edge of the distributor element 15, as viewed in the flow direction of the conveying air stream, there is supported a blower bar 16 oriented perpendicularly with respect to the longitudinal axis of the main duct 1. The blower bar 16 is a tubular rod which, on its face oriented towards the incoming fiber tufts 4, that is, in the direction of the main duct 1, has a plurality of openings 17 spaced in the direction parallel to the bar length, as shown in FIG. 2a. Since the openings 17 are centrally intersected by a common plane A, the partial countercurrent streams emitted by the openings 17 lie in a single plane. The blower bar 16 is coupled to a source of pressurized air (not shown). The distributor wedge 15 has a symmetry plane B which is oriented perpendicularly to the plane of FIG. 2 and which contains the longitudinal axis C of the main duct 1 and centrally and longitudinally intersects the blower bar 16, such that plane A and B coincide.

Turning now to FIG. 3, there is shown a further embodiment of the invention which bears similarities to that illustrated in FIG. 1. An approximately semi-cylindrical dividing element 18 having a central aperture 19 is arranged on the inner wall of the branch ducts 2 and 3. The air stream generated by the blower 11 passes through an opening 8c of the duct wall into a chamber 20 defined by the semi-cylindrical divider 18 and the inner wall of the ducts 2 and 3 and then passes through the opening 19 in a direction opposite to that of the fiber tufts delivered in the main duct 1. The distributor element 18 deflects the fiber tuft streams into the branch ducts 2 and 3. The air stream emanating through the opening 19 prevents fiber material from settling on the distributor element 18. The semi-cylindrical distributor element 18 has a symmetry plane D which is oriented perpendicularly to the plane of FIG. 3 and which contains the longitudinal axis C of the main duct 1 and centrally intersects the opening 19.

Turning now to the embodiment illustrated in FIG. 4, there is shown a Y-shaped distributor system whose leg is formed by the main duct 1 and its branches are formed by branch ducts 2a and 3a. At the location of intersection (branching zone) between the branch ducts 2a and 3a the branch duct wall is provided with an opening 8d. From the main duct 1 two bypass ducts 21 and 22 extend which have a smaller cross-sectional area than that of the main duct 1 or the branch ducts 2a, 3a and which open into a common air distributor chamber 23 situated at the outer wall of the branching zone. One part of the tuft conveying air stream passes into the bypass ducts 21 and 22 from the main duct 1 and is admitted into the distributor chamber 23 from which, through the opening 8d, it re-enters the Y duct in an orientation opposite to the direction of the conveying stream arriving in the main duct 1. This embodiment dispenses with a separate source of pressurized air. The air quantity in the system remains constant based on the principle of circulating air.

It will be understood that the above description of the present invention is susceptible to various modifications, changes and adaptations, and the same are intended to be comprehended within the meaning and range of equivalents of the appended claims.

What is claimed is:

1. In an apparatus for pneumatically conveying fiber tufts in a duct system of a fiber processing plant preparing fiber material for spinning, including a main duct and at least two branch ducts communicating with said main duct in a branching zone; said material being entrained by a gas stream from said main duct into said branch ducts; said main duct having a longitudinal axis passing through said branching zone; the improvement comprising
    (a) means for generating a countercurrent;
    (b) a flow distributor element supported in said branching zone and having a symmetry plane; said longitudinal axis of said main duct lying in said symmetry plane; and
    (c) a tubular bar supported in said branching zone spaced from said flow distributor element in a direction towards said main conduit; said tubular bar having a plurality of openings oriented toward said main duct and being intersected by said symmetry plane for introducing the countercurrent through said openings in said branching zone solely into said main duct parallel to said longitudinal axis.

2. An apparatus as defined in claim 1, wherein said flow distributor element is wedge-shaped and has an edge lying in said symmetry plane and intersecting said longitudinal axis of said main duct.

3. An apparatus as defined in claim 1, wherein said flow distributor element is wedge-shaped and has an edge lying in said symmetry plane and intersecting said longitudinal axis of said main duct.

* * * * *